(12) United States Patent
Wei et al.

(10) Patent No.: US 8,861,836 B2
(45) Date of Patent: Oct. 14, 2014

(54) METHODS AND SYSTEMS FOR 2D TO 3D CONVERSION FROM A PORTRAIT IMAGE

(75) Inventors: Jianing Wei, San Jose, CA (US); Alexander Berestov, San Jose, CA (US); Chuen-Chien Lee, Pleasanton, CA (US); Xue Tu, San Jose, CA (US); Xiaoling Wang, San Jose, CA (US)

(73) Assignee: Sony Corporation, Tokyo (JP)

( * ) Notice: Subject to any disclaimer, the term of this patent is extended or adjusted under 35 U.S.C. 154(b) by 642 days.

(21) Appl. No.: 13/007,411

(22) Filed: Jan. 14, 2011

(65) Prior Publication Data

US 2012/0183202 A1 Jul. 19, 2012

(51) Int. Cl.
*G06K 9/00* (2006.01)
*H04N 13/02* (2006.01)

(52) U.S. Cl.
CPC .......... *H04N 13/026* (2013.01); *G06K 9/00234* (2013.01)
USPC ........... 382/154; 382/118; 382/190; 382/194; 382/224; 382/173

(58) Field of Classification Search
USPC .................. 382/154, 118, 190, 224, 173, 194
See application file for complete search history.

(56) References Cited

U.S. PATENT DOCUMENTS

| | | | |
|---|---|---|---|
| 7,103,211 B1 * | 9/2006 | Medioni et al. ............... | 382/154 |
| 2004/0189796 A1 | 9/2004 | Ho et al. | |
| 2007/0070440 A1 * | 3/2007 | Li et al. ......................... | 358/448 |
| 2007/0286476 A1 * | 12/2007 | Kim et al. ...................... | 382/154 |
| 2008/0150945 A1 * | 6/2008 | Wang et al. .................... | 345/427 |
| 2008/0253617 A1 | 10/2008 | Ernst et al. | |
| 2009/0184955 A1 * | 7/2009 | Thiele ........................... | 345/419 |
| 2009/0196492 A1 | 8/2009 | Jung et al. | |
| 2009/0263046 A1 * | 10/2009 | Imai .............................. | 382/286 |
| 2010/0026784 A1 | 2/2010 | Burazerovic | |
| 2010/0073364 A1 | 3/2010 | Jung et al. | |
| 2010/0091093 A1 * | 4/2010 | Robinson ........................ | 348/47 |
| 2010/0091140 A1 * | 4/2010 | Pan .......................... | 348/231.99 |
| 2010/0123815 A1 * | 5/2010 | Yim et al. ................ | 348/333.02 |
| 2010/0182406 A1 * | 7/2010 | Benitez ........................... | 348/46 |
| 2010/0220920 A1 | 9/2010 | Barenbrug | |
| 2011/0018976 A1 * | 1/2011 | Park ................................ | 348/51 |
| 2011/0188780 A1 * | 8/2011 | Wang et al. .................... | 382/293 |

OTHER PUBLICATIONS

A Statistical method for 3D object detection—faces and cars., Schneiderman et al, IEEE, 1063-6919, 2000, pp. 1-6.*
A Statistical method for 3D object detection—faces and cars., Schneiderman et al, I EEE, 1063-6919, 2000, pp. 1-6.*
A statistical—Cars, Schneiderman et al., IEEE, 1063-6919,2000, pp. 1-6.*

* cited by examiner

*Primary Examiner* — Jayesh A Patel
(74) *Attorney, Agent, or Firm* — Haverstock & Owens LLP

(57) ABSTRACT

A method for converting a 2D image into a 3D image includes receiving the 2D image; determining whether the received 2D image is a portrait, wherein the portrait can be a face portrait or a non-face portrait; if the received 2D image is determined to be a portrait, creating a disparity between a left eye image and a right eye image based on a local gradient and a spatial location; generating the 3D image based on the created disparity; and outputting the generated 3D image.

11 Claims, 10 Drawing Sheets

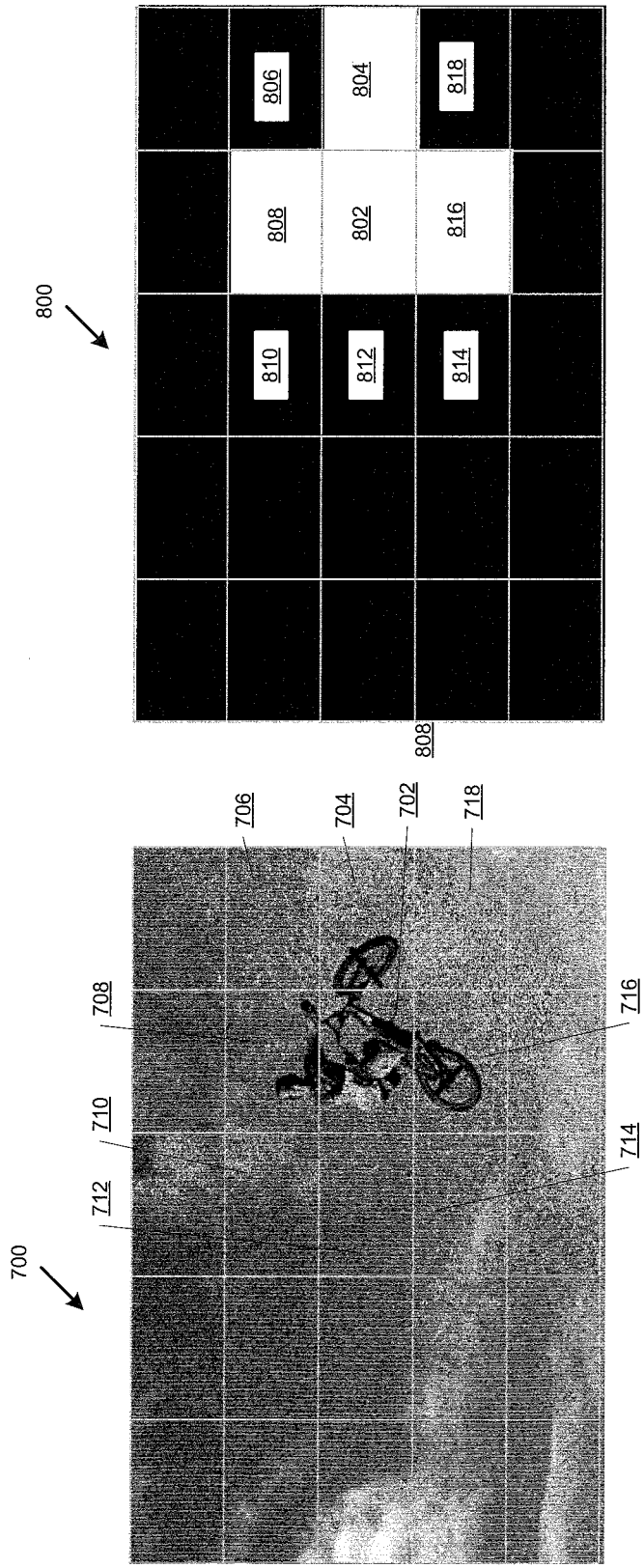

METHODS AND SYSTEMS FOR 2D TO 3D CONVERSION FROM A PORTRAIT IMAGE

TECHNICAL FIELD

The present disclosure relates to methods and systems for converting a portrait or close-up image in a two-dimensional ("2D") format into an image in a three-dimensional ("3D") format.

BACKGROUND

As 3D display technologies have become part of a next wave of promising technologies for consumer electronics, a demand for 3D content is rapidly increasing. The conversion of image data from 2D to 3D, a fast way to obtain 3D content from existing 2D content, has been extensively studied. Nevertheless, most of the existing 2D-to-3D conversion technologies are for videos or a sequence of images, but not for a single image. The conversion of a single image from 2D to 3D is a challenging problem due at least in part to the fact that the single 2D image data lacks depth information, motion information, and prior knowledge about the scene or objects to be reconstructed in a 3D format.

Although some technologies have been developed for single image 2D to 3D conversion, most of those technologies focus on conversion of outdoor or indoor images taken at a moderate or far distance (e.g., over 10 meters from a camera). In addition, most conventional technologies reconstruct a 3D scene or object under a general setting for the scene or object and are based on segmentation and learning techniques. However, these technologies do not work well for converting a single close-up or portrait image into a 3D image.

SUMMARY

The present disclosure includes an exemplary method for converting a 2D image into a 3D image. Embodiments of the method include receiving the 2D image, and determining whether the received 2D image is a portrait, wherein the portrait can be a face portrait or a non-face portrait. Embodiments of the method may also include creating a disparity between a left eye image and a right eye image based on a local gradient and a spatial location if the received 2D image is determined to be a portrait, generating the 3D image based on the created disparity, and outputting the generated 3D image.

An exemplary system in accordance with the present disclosure comprises a user device to receive a 2D image and a 2D-to-3D portrait converter coupled to the user device. The 2D-to-3D portrait converter determines whether the 2D image is a portrait, wherein the portrait can be a face portrait or a non-face portrait. In some embodiments, the 2D-to-3D portrait converter also creates a disparity between a left eye image and a right eye image based on a local gradient and a spatial location if the 2D image is determined to be a portrait, generates the 3D image based on the created disparity, and renders the generated 3D image.

It is to be understood that both the foregoing general description and the following detailed description are exemplary and explanatory only and are not restrictive of the invention, as claimed.

BRIEF DESCRIPTION OF THE DRAWINGS

FIG. 7 illustrates an exemplary 2D image for segmentation of foreground and background.

FIG. 8 illustrates an exemplary result of foreground and background segmentation for the image of FIG. 7.

DETAILED DESCRIPTION

Reference will now be made in detail to the exemplary embodiments illustrated in the accompanying drawings. Wherever possible, the same reference numbers will be used throughout the drawings to refer to the same or like parts.

Methods and systems disclosed herein address the above described needs. For example, exemplary embodiments may be used to detect a portrait or close-up image in a 2D format, and convert the 2D image into a 3D image.

Figure 1:
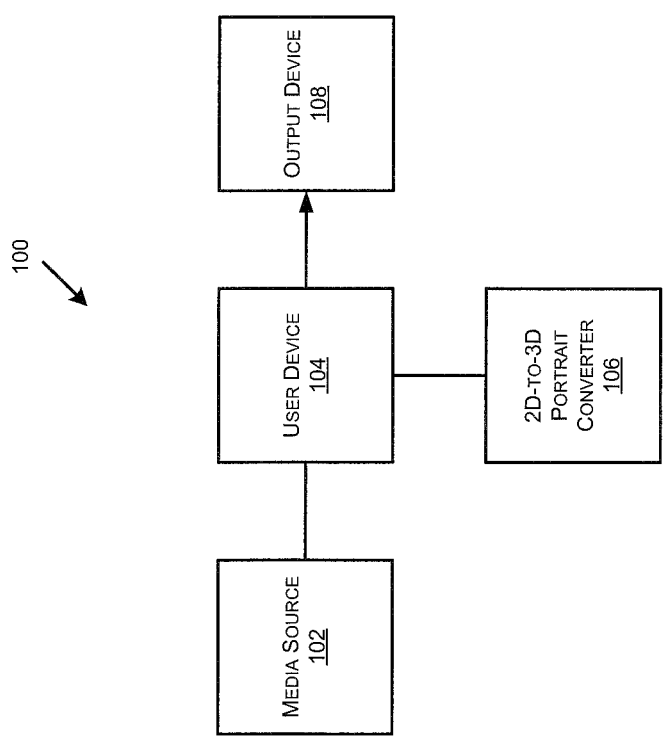
FIG. 1 illustrates a block diagram of an exemplary system consistent with the invention.

FIG. 1 illustrates a block diagram of an exemplary system 100 consistent with the invention. As shown in FIG. 1, exemplary system 100 may comprise a media source 102, a user device 104, a 2D-to-3D portrait converter 106, and an output device 108. Each of the components is operatively connected to one another via a network or any type of communication links that allow transmission of data from one component to another. The network may include Local Area Networks (LANs) and/or Wide Area Networks (WANs), and may be wireless, wired, or a combination thereof.

Media source 102 can be any type of storage medium capable of storing imaging data, such as video or still images. For example, media source 102 can be provided as a CD, DVD, Blu-ray disc, hard disk, magnetic tape, flash memory card/drive, volatile or non-volatile memory, holographic data storage, and any other type of storage medium. Media source 102 can also be an image capturing device or computer capable of providing imaging data to user device 104. For example, media source 102 can be a camera capturing imaging data and providing the captured imaging data to user device 104.

As another example, media source 102 can be a web server, an enterprise server, or any other type of computer server. Media source 102 can be a computer programmed to accept requests (e.g., HTTP, or other protocols that can initiate data transmission) from user device 104 and to serve user device 104 with requested imaging data. In addition, media source 102 can be a broadcasting facility, such as free-to-air, cable, satellite, and other broadcasting facility, for distributing imaging data.

User device 104 can be, for example, a computer, a personal digital assistant (PDA), a cell phone or smartphone, a laptop, a desktop, a tablet PC, a media content player, a set-top box, a television set including a broadcast tuner, a video game station/system, or any electronic device capable of providing or rendering imaging data. User device 104 may include software applications that allow user device 104 to communicate with and receive imaging data from a network or local storage medium. As mentioned above, user device 104 can receive data from media source 102, examples of which are provided above.

As shown in FIG. 1, 2D-to-3D portrait converter 106 can be implemented as a software program executing in a processor and/or as hardware that performs portrait image 2D-to-3D conversion. Portrait converter 106 can detect a 2D portrait image, and convert the 2D image into a 3D image. A portrait image is also called a close-up image, which can be, for example, an image including a close-up object or a compact group of connected objects. In some embodiments, a portrait image can include a sharp foreground and a blurring background. Moreover, a portrait image can be, for example, a face portrait image including a large facial region (or a large human face image) whose size exceeds a certain proportion of the portrait image. Furthermore, a portrait image can be, for example, a non-face portrait image including a blurry background and a sharp foreground but without a large facial region (or a large human face image). Methods for portrait detection and 2D-to-3D conversion will be further described below.

Output device 108 can be, for example, a computer, personal digital assistant (PDA), cell phone or smartphone, laptop, desktop, media content player, set-top box, television set including a broadcast tuner, video game controller, or any electronic device capable of accessing a data network and/or receiving imaging data. In some embodiments, output device 108 can be a display device such as, for example, a television, monitor, projector, digital photo frame, display panel, or any other display device. In certain embodiments, output device 108 can be a printer.

While shown in FIG. 1 as separate components that are operatively connected, some or all of media source 102, user device 104, 2D-to-3D portrait converter 106, and output device 108 may be co-located in one device. For example, media source 102 can be located within or form part of user device 104, 2D-to-3D portrait converter 106 can be located within or form part of media source 102, user device 104, or output device 108, and output device 108 can be located within or form part of user device 104. It is understood that the configuration shown in FIG. 1 is for illustrative purposes only. Certain components or devices may be removed or combined and other components or devices may be added.

Exemplary methods for detecting a 2D portrait image and converting it into a 3D image will now be described. In general, exemplary methods are disclosed herein as having two stages. In a first stage, the methods determine and detect whether a 2D image is a portrait image, either a face portrait or a non-face portrait. In a second stage, the 2D portrait image is converted into a 3D image by creating a disparity between left eye and right eye images based on local gradients and/or spatial locations. The local gradients and spatial locations compensate for the lack of depth information.

Figure 2A:
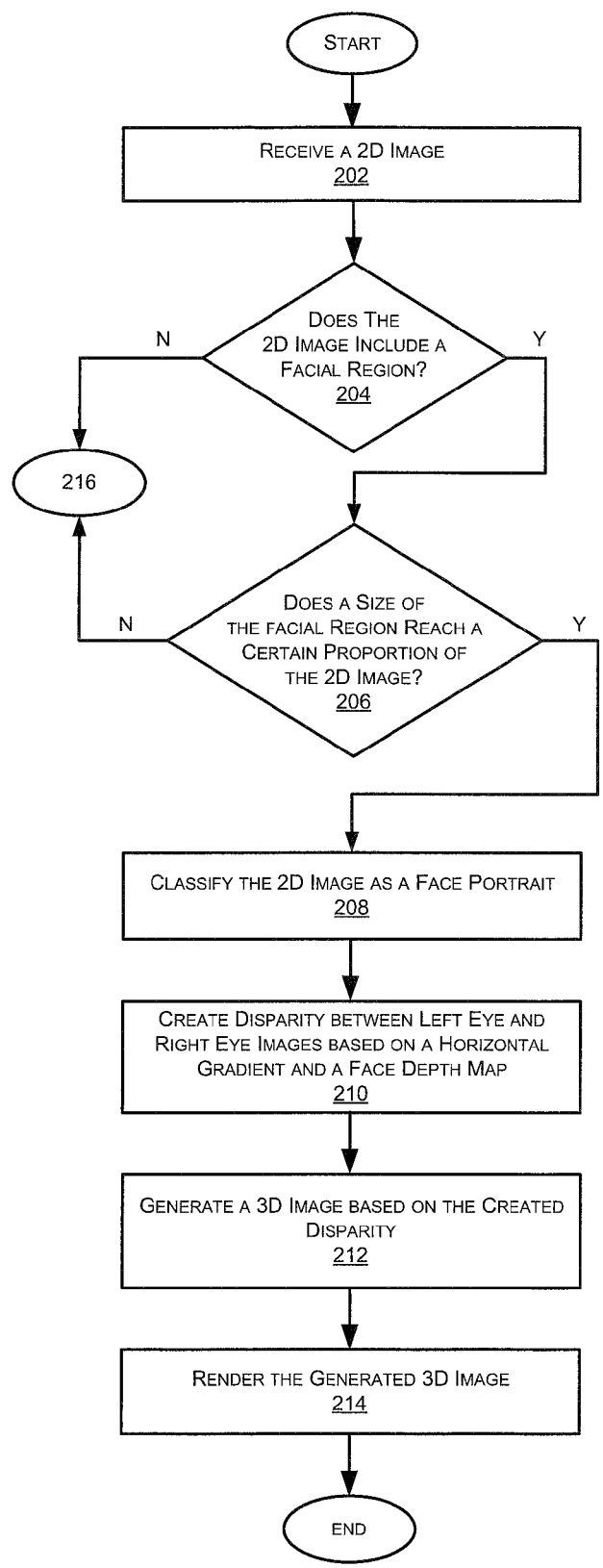
FIG. 2A is a flow chart illustrating an exemplary method for face portrait detection and 2D-to-3D conversion.
Figure 2B:
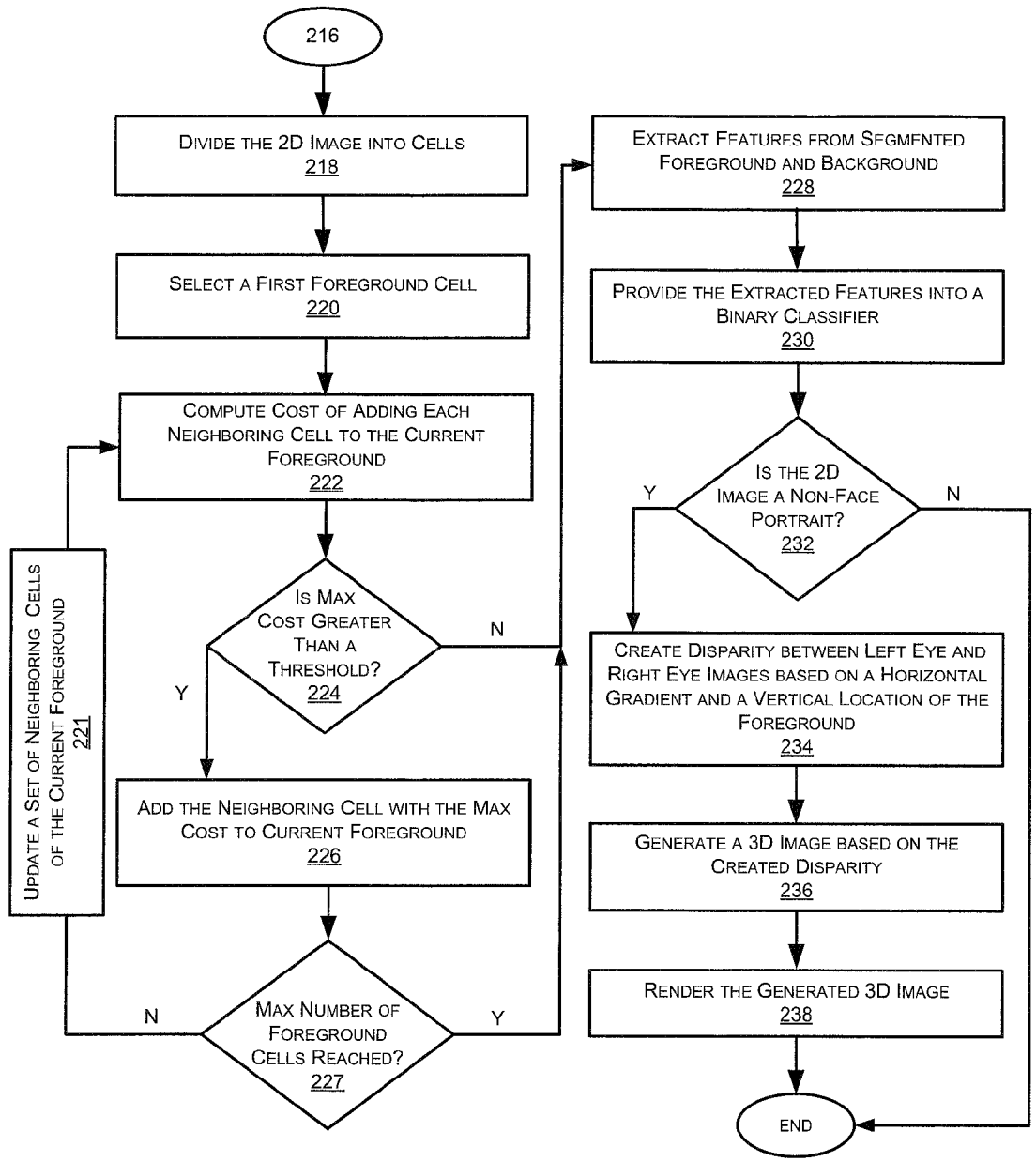
FIG. 2B is a flow chart illustrating an exemplary method for non-face portrait detection and 2D-to-3D conversion.

FIG. 2A is a flow chart illustrating an exemplary method for face portrait detection and 2D-to-3D conversion. A face portrait may be characterized by, for example, a large facial region containing a human face image. As shown in FIG. 2, a 2D image is received (step 202). The 2D image is scanned to detect if it includes a human face image or a facial region containing a human face image (step 204). Determination of whether the 2D image comprises a human face image or facial region containing a human face image may be performed using standard face detection methods or software, such as Sony's S-face. If the 2D image is determined not to include a human face image or a facial region, the method proceeds to step 216, which will be further described with reference to FIG. 2B.

If the 2D image is determined to include a human face image or a facial region, the human face image or the facial region may be examined to determine whether it meets certain criteria or thresholds such that the 2D image may be classified as a face portrait. In some embodiments, the classification may be based on the size of the human face image or the facial region relative to a size of the 2D image, or a ratio between the two sizes. For example, the human face image or the facial region may be measured and it may be determined what percentage (or ratio) of the total 2D image is occupied by the face image or facial region (step 206). If the determined percentage equals or exceeds a certain threshold (e.g., 25%) of a total size of the 2D image, the 2D image is classified as a face portrait (step 208). If the determined percentage is less than the threshold, the method proceeds to step 216. The certain criteria or thresholds, e.g., the certain proportion of the total size of the 2D image, may be stored in a database, and may be determined empirically or configured by a user.

After the 2D image is classified as a face portrait, the 2D image may be converted into a 3D image. In some embodiments, the 2D-to-3D conversion may be done by computing or creating a disparity between left eye and right eye images. Three-D image data comprises corresponding left eye and right eye images of the same object or objects but from the slightly different perspectives of the left and right eyes. The left eye and eye right images may be used to create the illusion of a 3D scene or object by controlling how the images are displayed to each of the viewer's eyes. In some cases, 3D eyewear may be used to control how the images are displayed to each of a viewer's eyes. If a viewer's left and right eyes observe different images where a same object sits at different locations on a display screen, the user's brain can create an illusion as if the object were in front of or behind the display screen.

In some embodiments, the disparity between the left eye and right eye images may be created based on local gradients, for example, by shifting pixels of the 2D image to the left or right. If a region is shifted to the right for the left eye and shifted to the left for the right eye, then the region may appear to be in front of a display screen. Otherwise, it may appear to be behind the display screen.

Figure 3:
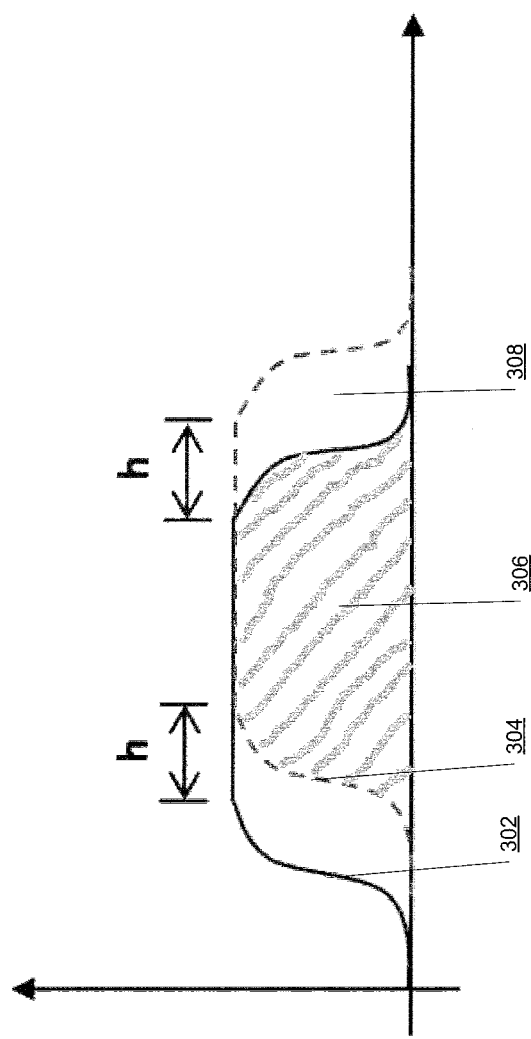
FIG. 3 illustrates an exemplary embodiment for edge shifting to create a disparity between left and right eye images.

In some embodiments, the disparity between the left eye and right eye images may be created based on local gradients, for example, by shifting edges (or pixels of edges) of a region, without shifting other parts of the region. For example, FIG. 3 illustrates an exemplary embodiment for edge shifting to create a disparity between left and right eye images. In FIG. 3, a solid line 302 forms the edge of a first hump shape, and a dashed line 304 forms the edge of a second hump shape after shifting edges of the original shape. In FIG. 3, the edges of the original shape are shifted by an amount, h. The amount to shift the edges, h, may be determined by the horizontal gradient magnitude and a disparity level adjusted by the user or determined empirically. An intersection 306 (a striped region in FIG. 3) of the two hump shapes defined by solid line 302 and dashed line 304 is not shifted. Nevertheless, it appears as if the entire shape is shifted to the right. In certain embodiments, interpolation (or inpainting) techniques may be used to fill in or recover image data at a gap 308 due to shifting one or more edges. Shifting pixels on the edges can create an effect of shifting the entire region, and create the illusion of depth. For a portrait image, the foreground appears to pop out from the blurry background.

In some embodiments, the disparity between the left eye and right eye images may also be created based on spatial locations. For a face portrait, the disparity may be created not only based on the face image's local gradients but also based on its locations in the detected facial region. In some embodiments, knowledge about a relationship between the spatial locations and relative depth can be acquired during face portrait detection. This knowledge can be used to create the disparity between the left eye and right eye images.

Figure 4:
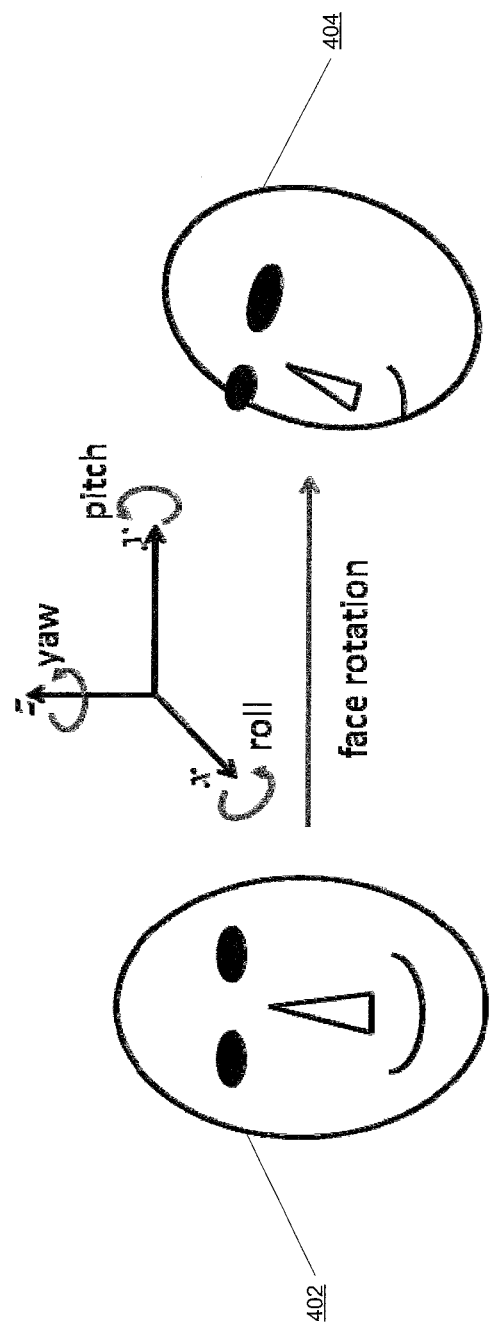
FIG. 4 illustrates an exemplary face rotation that may be encountered during a face portrait 2D-to-3D conversion.

For example, in some embodiments, a face depth map, e.g., a preliminary face depth map, may be generated according to the face detection result. The face depth map can be based on any models. For example, it can be based on a simple ellipsoid model, or any other more sophisticated 3D facial model acquired during the face detection. A 3D facial model may take into account positions of eye, mouth, nose, etc. A face detection method may not only provide a face location, but also provide a face rotation angle in three dimensions. For example, FIG. 4 illustrates an exemplary face rotation that may be encountered during a face portrait 2D-to-3D conversion. As illustrated in FIG. 4, a face 402 may be rotated in a certain angle to appear as face 404. In face 404, the rotation of the face leads to changes or adjustment in positions and sizes of face parts including eye (left and/or right eye), nose, and/or mouth, as they appear to the left and right eyes, relative to the same face parts in face 402. The face rotation may also lead to changes or adjustment in global face depth. Accordingly, the face depth map may need to be changed or adjusted to account for the face rotation. In addition, the horizontal gradient may be also considered in creating the disparity between the left eye and right eye images.

Referring back to FIG. 2A, in some embodiments, the disparity between the left eye and right eye images may be determined by a combination of the horizontal gradients and the face depth map. For example, in some embodiments, the disparity may be created by shifting edges (or pixels of edges) of the detected face image according to their corresponding edge strength (gradient magnitude at edge points) and values in the depth map (step 210). In certain embodiments consistent with the present disclosure, non-edge regions or flat areas are not shifted.

Figure 6:
FIG. 6 illustrates an exemplary result of a 2D-to-3D conversion of the face portrait image of FIG. 5.
Figure 5:
FIG. 5 illustrates an exemplary 2D face portrait image.

Based on shifting of edges or creating of the disparity between the left eye and right eye images, a 3D face portrait image may be generated (step 212). FIG. 5 illustrates an exemplary 2D face portrait image, and FIG. 6 illustrates an exemplary result of a 2D-to-3D conversion from the face portrait image of FIG. 5, according to the methods and systems disclosed herein. A viewer wearing eyewear such as anaglyph glasses may see the 3D effect in the 3D image of FIG. 6.

Referring back to FIG. 2A, after the 3D image is generated, it may be rendered for output (step 214). In some embodiments, for example, the generated 3D image may be displayed. In other embodiments, for example, the generated 3D image may be rendered for printing, etc.

FIG. 2B is a flow chart illustrating an exemplary method for non-face portrait detection and 2D-to-3D conversion. A non-face portrait may be, for example, an image without a large facial region. A non-face portrait may have, for example, a blurry background and a sharp foreground. In the exemplary method described in FIG. 2B, an approximate region containing a foreground object is determined. One or more features from both the foreground and background are extracted, and the 2D image is classified as a portrait or non-portrait based on the extracted features. After classification, the 2D portrait image may be converted into a 3D image based on local gradients and/or spatial locations.

An approximate foreground region may be determined according to local sharpness. There are various ways to define sharpness. In some embodiments, for example, the sharpness may be defined as horizontal gradient magnitude. Other sharpness measures can also be applied without having to change the foreground region detection algorithm disclosed herein.

As illustrated in FIG. 2B, to begin the process of determining foreground and background regions, the 2D image may be divided into a number of cells (step 218). In some embodiments, the 2D image is divided into an equal number of rows and columns. For example, the 2D image can be divided into M×M cells, where M can be a number, e.g., 5, acquired empirically or configured by a user, and can be stored in a database.

FIG. 7 illustrates an exemplary 2D image 700 for segmentation of foreground and background. As illustrated in FIG. 7, 2D image 700 is divided into, for example, 5×5=25 cells. A foreground object, a person on a bicycle jumping in the air, is located in cells 702, 704, 708, and 716.

Returning now to FIG. 2B, a first foreground cell is selected and added to the current foreground (step 220). The first foreground cell may be any one of the M×M cells. In methods consistent with the present disclosure, the first foreground cell is selected based on one or more criteria that indicate a likelihood that it contains a foreground image. For example, in some embodiments, the cell with the highest ratio between an average foreground sharpness value and an average background sharpness value, e.g., $r=\overline{S}_f/\overline{S}_b$, where $\overline{S}_f$ is an average foreground sharpness value and $\overline{S}_b$ is an average background sharpness value, is selected as the first foreground cell.

Average foreground sharpness value $\overline{S}_f$ for a candidate foreground cell may be calculated as $$\overline{S}_f = \frac{1}{N_f} \sum_{(i,j) \in F} S_{i,j},$$

where F is the candidate foreground cell, $S_{i,j}$ denotes a sharpness value for a particular pixel (i,j) in the cell, and $N_f$ is the number of pixels in the candidate foreground cell. Similarly, an average background sharpness value for a candidate background region (e.g., all cells excluding the candidate foreground cell) may be calculated as $$\overline{S}_b = \frac{1}{N_b} \sum_{(i,j) \in B} S_{i,j},$$

where B is the candidate background region. $S_{i,j}$ denotes a sharpness value for a particular pixel (i,j) in the region, and $N_b$ is the number of pixels in the candidate background region.

In FIG. 7, for example, cell 702 appears to have the greatest amount of foreground region. It is expected that, of all the cells in FIG. 7, cell 708 would have the maximum ratio, $r=\overline{S}_f/\overline{S}_b$, that is, the ratio between an average foreground sharpness value and an average background sharpness value. Thus, cell 702 is selected as a first foreground cell and added to a current foreground.

Next, in a series of iterations, additional foreground cells may be determined. In some embodiments, the additional foreground cells can be iteratively selected based on a cost function. One exemplary cost function for selecting a foreground cell can be defined as $c=r \cdot p$, where p is the percentage of foreground sharpness which may be calculated as $p=\Sigma_{(i,j) \in F} S_{i,j} / \Sigma_{(i,j) \in F \cup B} S_{i,j}$, that is, the ratio between $\Sigma_{(i,j) \in F} S_{i,j}$, a sum of sharpness values for pixels in a candidate foreground region F (e.g., a region including selected foreground cells and a particular cell to be considered), and $\Sigma_{(i,j) \in F \cup B} S_{i,j}$, a total or a sum of sharpness values for pixels in the candidate foreground region F and in the candidate background region B (e.g., $F \cup B$ is the entire image).

In step 222, a cost may be computed for each neighboring cell to the current foreground which, in the first iteration, is the first foreground cell. The cost, $c_i$, is the cost to add the ith neighboring cell to the current foreground. The neighboring cell that maximizes the cost c or has the highest cost c among the current neighboring cells is evaluated against a threshold.

If the maximum cost c is less than or equal to a threshold, e.g., a cost from a previous iteration (step 224), then all foreground cells have been determined, and the remainder of the cells are assumed to contain only background. In the first iteration, the cost c may be set to zero or some other low number, such that the first iteration will store the cost of the first foreground cell.

Otherwise, if the maximum cost c for the current neighboring cells is greater a threshold, e.g., a cost from a previous iteration (step 224), the candidate neighboring cell corresponding to the maximum cost is determined to be part of the current foreground, and is added to the current foreground (step 226). The current foreground is thus updated.

The system may be optionally designed such that a maximum number of foreground cells may be determined. If so, then a count of cells in the current foreground is maintained. The maximum number may be set by the user or determined empirically, e.g., $M_x=9$. If the maximum number of foreground cells has not been reached (step 227), the set of current neighboring cells of the current foreground is updated (step 221), and the updated set of neighboring cells is considered in the next iteration (step 222).

For example, as shown in FIG. 7, in a first iteration, the current foreground includes only cell 702. The set of neighboring cells of the current foreground includes cells 704, 706, 708, 710, 712, 714, 716, and 718. A cost, c, for adding a particular neighboring cell to the current foreground is calculated for each of the set of neighboring cells. Cell 716 results in the maximum cost function $c=r \cdot p$, which is greater than a cost in the previous iteration with only one foreground cell 702. Accordingly, cell 716 is added to the current foreground. In following iterations, cells 704 and 708 are also selected as foreground cells and are added to the current foreground. After that, the iteration terminates because the resulting cost c for the current iteration is less than or equal to the cost from the previous iteration.

FIG. 8 illustrates an exemplary result of foreground and background segmentation for 2D image 700 of FIG. 7. As illustrated in FIG. 8, the foreground is segmented from the background. Foreground cells 802, 804, 808, and 816 are shown in white and the background cells are shown in black. Cells 806, 810, 812, 814, and 818 are neighboring cells of a foreground region and are considered during the foreground and background segmentation.

Referring back to FIG. 2B, after the 2D image is segmented into foreground and background, features may be extracted from the 2D images using the segmentation (step 228). The extracted features may include, for example, a maximum vertical gradient of the background region, a cost c as defined above, a maximum difference between an average color of upper and lower parts of the background region, an average background sharpness value, an above-described ratio between an average foreground sharpness value and an average background sharpness value, a horizontal span of the foreground region, a min-max vertical gradient among all columns, or the like. For example, the min-max vertical gradient among all columns can be computed as follows: a maximum vertical gradient for each column of cells can be first computed, and then a minimum of these values over all columns of cells is selected.

In step 230, the extracted features may be provided to a binary classifier. Based on the extracted features, the binary classifier determines whether the 2D image should be classified as a non-face portrait (step 232). In exemplary embodiments, any known binary classifier may be used, such as a k-Nearest-Neighbor classifier. The accuracy of binary classifiers may be improved with machine learning. For example, the binary classifier may be trained using training images (both portrait and non-portrait images) to perform the classification and improve accuracy. For example, in some experiments, a group of training images (e.g., 76 images) may be used to train the binary classifier, which then performs the classification on a group of testing images (e.g., 64 images).

With reference to FIG. 2B, if the binary classifier does not classify the 2D image as a non-face portrait, the method ends. Otherwise, if the 2D image is detected or classified as a non-face portrait, the 2D image can be converted into a 3D image. In some embodiments, the 2D-to-3D conversion can be done by computing or creating a disparity between left eye and right eye images. The disparity can be created based on local gradients and/or spatial locations, such as based on horizontal gradients and/or vertical positions of the segmented foreground in the 2D image (step 234).

In some embodiments, the disparity between left eye and right eye images can be created based on horizontal gradients, for example, by utilizing the above-described edge shifting technologies. Edges (or pixels of edges) of the foreground object in the non-face portrait 2D image can be shifted to the left or right. The horizontal gradients determine an amount of the disparity. Further, interpolation (or inpainting) technologies can be utilized to fill in or recover image data at a gap due to shifting of edges.

In some embodiments, the disparity between left eye and right eye images can be created based on vertical locations or positions of the foreground object. The vertical locations may be used to reduce or avoid frame violation. Frame violation occurs when, after a 2D image is converted to 3D, a foreground object near a border appears to be in front of the display screen. If the image of the foreground object contacts the bottom of the display screen, the foreground object may appear to be clipped off by the bottom edge of the display screen, thereby giving an illusion that a closer object is blocked by a farther object which contradicts a human's normal experience. As a result, frame violation may cause visual discomfort to a user when looking at the 3D image.

One solution for the frame violation problem is to let the disparity not only depend on the horizontal gradients but also depend on the vertical positions. Based on the vertical positions, the bottom of the foreground object can be adjusted to be at the level of the display screen, i.e., the disparity of the bottom of the foreground object becomes zero or is close to zero. This can be achieved by multiplying the disparity by a coefficient that increases with a distance to the bottom of the foreground object (or the bottom of the display screen). Then the disparity is decreased when approaching the bottom of the foreground object (or the bottom of the display screen) such that the contact point of the foreground object with the screen frame has a disparity of zero or near zero (at the level of the display screen). By this method, the frame violation can be reduced or avoided. In some embodiments, frame violation may also occur at the top or a side of a foreground object, and can also be solved using the above-described method. For example, the disparity can be adjusted relative to the top or the side of the foreground object (or the display screen), according to the above-described method. The frame violation problem may also occur during a 2D-to-3D conversion from a face portrait image, and can also be solved using the above-described method.

Figure 9:
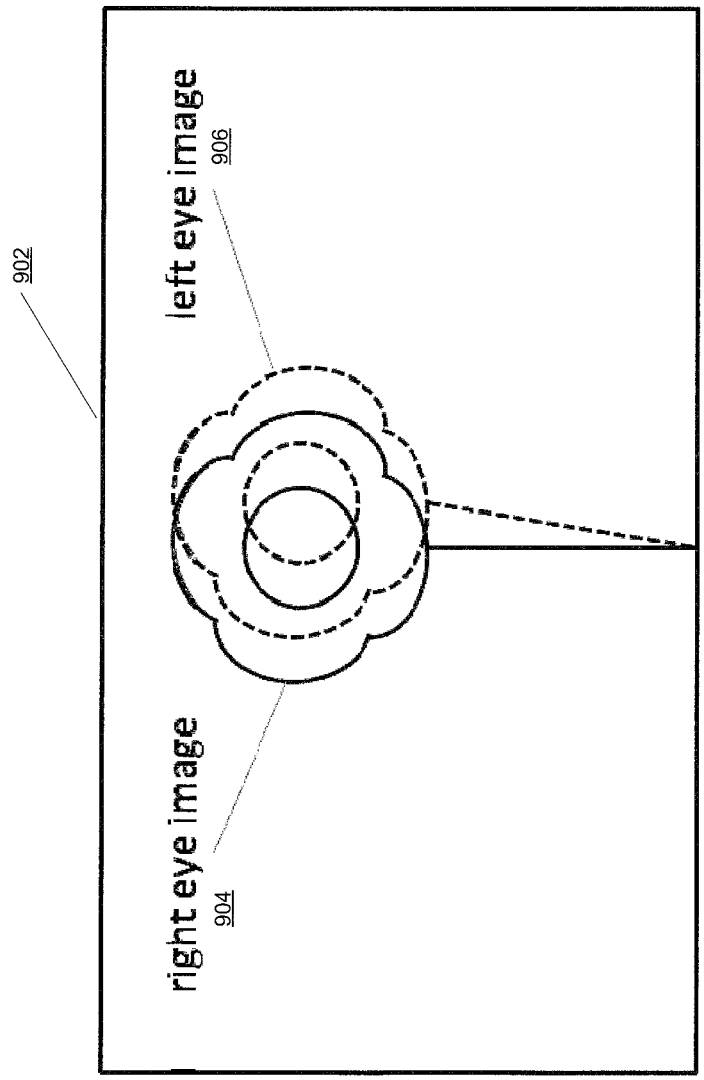
FIG. 9 illustrates an exemplary embodiment for reducing or avoiding frame violation during portrait 2D-to-3D conversion.

For example, FIG. 9 illustrates an exemplary embodiment for reducing or avoiding a frame violation during portrait 2D-to-3D conversion. As shown in FIG. 9, when a 3D image is displayed on a display screen 902, a right eye image 904 (represented by solid lines) is overlaid on top of a left eye image 906 (represented by dotted lines). A shift or distance between these two images is the disparity. As illustrated in FIG. 9, the disparity is adjusted so that it is zero or close to zero at the bottom of display screen 902, and it increases along a direction toward a top of the screen. This technique can create a visual effect that the bottom of the foreground object is at the level of the screen (the frame violation is reduced or avoided), and gradually the foreground object sticks out of the screen.

Figure 11:
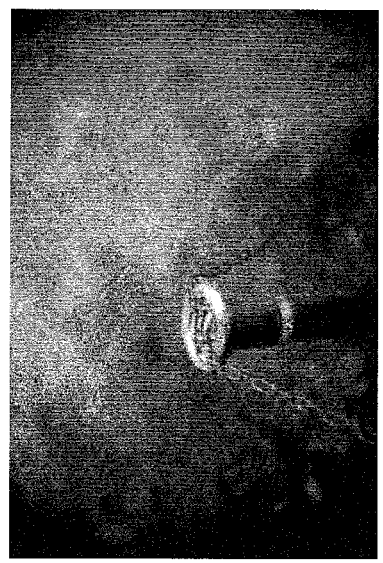
FIG. 11 illustrates an exemplary result of 2D-to-3D conversion of the non-face portrait image of FIG. 10.
Figure 10:
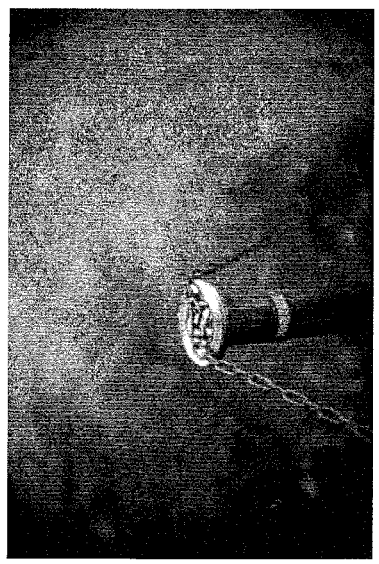
FIG. 10 illustrates an exemplary 2D non-face portrait image.

Referring back to FIG. 2B, based on the created a disparity between the left eye and right eye images of the 2D image, a 3D image may be generated (step 236). FIG. 10 illustrates an exemplary 2D non-face portrait image, and FIG. 11 illustrates an exemplary result of a 2D-to-3D conversion from the non-face portrait image of FIG. 10, according to the above-presented methods. A viewer wearing eyewear such as anaglyph glasses may see foreground and background separation and natural 3D rendering in FIG. 11.

Referring back to FIG. 2B, after the 3D image is generated, it may be rendered for output (step 238). In some embodiments, for example, the generated 3D image is displayed. In other embodiments, for example, the generated 3D image can be rendered for printing, etc.

It is understood that the above-described exemplary process flows in FIGS. 2A-B are for illustrative purposes only. Certain steps may be deleted, combined, or rearranged, and additional steps may be added.

Figure 12:
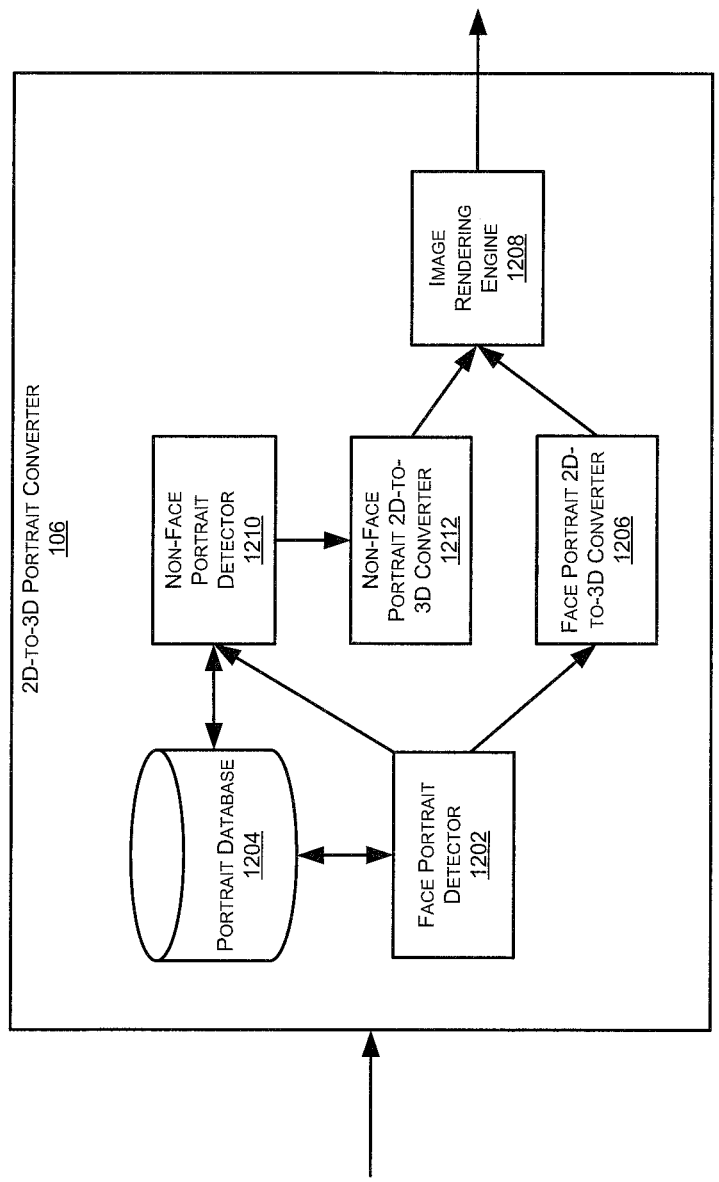
FIG. 12 is a block diagram illustrating an exemplary embodiment of a 2D-to-3D portrait converter 106 in the exemplary system 100 of FIG. 1.

FIG. 12 is a block diagram illustrating an exemplary embodiment of a 2D-to-3D portrait converter 106 in the exemplary system 100 of FIG. 1. As shown in FIG. 12, 2D-to-3D portrait converter 106 may include a face portrait detector 1202, a portrait database 1204, a face portrait 2D-to-3D converter 1206, an image rendering engine 1208, a non-face portrait detector 1210, and a non-face portrait 2D-to-3D converter 1212.

It is understood that components of 2D-to-3D portrait converter 106 shown in FIG. 12 are for illustrative purposes only. Certain components may be removed or combined and other components may be added. Also, one or more of the components depicted in FIG. 12 may be implemented in software on one or more computing systems. For example, such components may comprise one or more software applications, which may comprise one or more computer units including storage devices containing computer-readable instructions which, when executed by a processor, cause a computer to perform steps of a method. Computer-readable instructions may be stored on a tangible non-transitory computer-readable medium, such as a solid-state memory or disk memory. Alternatively, one or more of the components depicted in FIG. 12 may be implemented in hardware components or combinations of hardware and software such as, for example, ASICS, special purpose computers, or general purpose computers.

With reference to FIG. 12, 2D-to-3D portrait converter 106 receives a 2D image, e.g., a still image or a single frame of a video. Based on the above described criteria or thresholds acquired from, for example, portrait database 1204, face portrait detector 1202 can determine and detect whether the 2D image is a face portrait, as described above. In some embodiments, face portrait detector 1202 may store the detected face portrait in portrait database 1204, or pass the detected face portrait to face portrait 2D-to-3D converter 1206.

Portrait database 1204 can be used for storing a collection of data related to portrait detection and 2D-to-3D conversion. The storage can be organized as a set of queues, a structured file, a flat file, a relational database, an object-oriented database, or any other appropriate database. Computer software, such as a database management system, may be utilized to manage and provide access to the data stored in portrait database 1204. Portrait database 1204 may store, among other things, configuration information for face portrait detection and 2D-to-3D conversion, configuration information for non-face portrait detection and 2D-to-3D conversion, etc.

The configuration information for face portrait detection and 2D-to-3D conversion may include but is not limited to, for example, criteria or thresholds for detecting a facial region and determining a face portrait, configuration for detecting face rotations, face depth maps used for shifting edges (or pixels of edges) of 2D face images in creating a disparity between the left eye and right eye images, configuration for interpolation of image data, etc. The configuration information for non-face portrait detection and 2D-to-3D conversion may include but is not limited to, for example, numbers of rows and columns for dividing 2D images into cells, maximum number of foreground cells to be selected in segmentation of foreground and background of 2D images, definitions for sharpness values of pixels in 2D images, configuration for segmenting foreground objects from background objects in 2D images based on sharpness values, distances for shifting edges (or pixels of edges) of objects in 2D images for creating a disparity between the left eye and right eye images, configuration for interpolation of image data, configuration for reducing or avoiding a frame violation, etc. In some embodiments, portrait database 1204 may store detected face or non-face portraits for a training purpose to improve performance.

In some embodiments, if face portrait detector 1202 detects that the 2D image is a face portrait, face portrait 2D-to-3D converter 1206 can utilize the configuration information for face portrait 2D-to-3D conversion to convert the detected 2D face portrait image into a 3D image, as described above. The configuration information for face portrait 2D-to-3D conversion can be acquired from, for example, portrait database 1204 (connection to portrait database 1204 not shown). Face portrait 2D-to-3D converter 1206 can forward the 3D image to image rendering engine 1208, which can render the 3D image for output, e.g., display, printing out, etc.

In some embodiments, if face portrait detector 1202 determines that the 2D image is not a face portrait, it forwards the 2D image to non-face portrait detector 1210 for further process. Non-face portrait detector 1210 can determine and detect whether the 2D image is a non-face portrait based on the configuration information for non-face portrait detection, as described above. The configuration information for non-face portrait detection can be acquired from, for example, portrait database 1204. In some embodiments, non-face portrait detector 1210 includes a segmentation module for segmenting foreground from background in the 2D image, as described above. In some embodiments, non-face portrait detector 1210 further includes a binary classifier for classifying the 2D image as a non-face portrait based on features extracted from the segmented foreground and background of the 2D image, as described above.

If a non-face portrait is detected, it is forwarded to non-face portrait 2D-to-3D converter 1212. Non-face portrait 2D-to-3D converter 1212 can utilize the configuration information for non-face portrait 2D-to-3D conversion to convert the detected non-face portrait image into a 3D image, as described above. The configuration information for non-face portrait 2D-to-3D conversion can be acquired from, for example, portrait database 1204 (connection to portrait database 1204 not shown). The 3D image is forwarded to image rendering engine 1208 for output, e.g., display, printing out, etc.

During the above-described portrait detection and 2D-to-3D conversion processes, each component of 2D-to-3D portrait converter 106 may store its computation/determination results in portrait database 1204 for later retrieval or training purpose. Based on the historic data, 2D-to-3D portrait converter 106 may train itself for improved performance on detecting portraits and converting 2D portrait images into 3D images.

The methods and systems disclosed herein can convert a 2D portrait image into a 3D image. First, a 2D image can be classified as a portrait (e.g., a face or non-face portrait) or a non-portrait. Once a portrait is found, the 3D image can be generated based on a disparity between left eye and right eye images according to local gradients and spatial locations. Specifically, for the face portrait, horizontal gradients and a 3D face model can be used to compute the disparity. For the non-face portrait, horizontal gradients and vertical positions can be employed to compute the disparity. Using this approach, a frame violation can be reduced or avoided. Also, interpolation (or inpainting) technologies can be utilized to fill in or recover image data at a gap due to shifting of edges.

The methods disclosed herein may be implemented as a computer program product, i.e., a computer program tangibly embodied in a non-transitory information carrier, e.g., in a machine-readable storage device, or a tangible non-transitory computer-readable medium, for execution by, or to control the operation of, data processing apparatus, e.g., a programmable processor, a computer, or multiple computers. A computer program can be written in any form of programming language, including compiled or interpreted languages, and it can be deployed in any form, including as a standalone program or as a module, component, subroutine, or other unit suitable for use in a computing environment. A computer program can be deployed to be executed on one computer or on multiple computers at one site or distributed across multiple sites and interconnected by a communication network.

A portion or all of the methods disclosed herein may also be implemented by an application-specific integrated circuit (ASIC), a field-programmable gate array (FPGA), a complex programmable logic device (CPLD), a printed circuit board (PCB), a digital signal processor (DSP), a combination of programmable logic components and programmable interconnects, a single central processing unit (CPU) chip, a CPU chip combined on a motherboard, a general purpose computer, or any other combination of devices or modules capable of performing portrait detection and 2D-to-3D conversion disclosed herein.

In the preceding specification, the invention has been described with reference to specific exemplary embodiments. It will, however, be evident that various modifications and changes may be made without departing from the broader spirit and scope of the invention as set forth in the claims that follow. The specification and drawings are accordingly to be regarded as illustrative rather than restrictive. Other embodiments of the invention may be apparent to those skilled in the art from consideration of the specification and practice of the invention disclosed herein.

What is claimed is:

1. A computer-implemented method for converting a 2D image into a 3D image, the method comprising:
    receiving the 2D image;
    determining whether the received 2D image is a close-up image, wherein the close-up image is a face portrait or a non-face close-up image, wherein the close-up image includes a sharp foreground and a blurred background;
    if the received 2D image is determined to be a close-up image, creating a disparity between a left eye image and a right eye image based on a local gradient and a spatial location;
    generating the 3D image based on the created disparity;
    outputting the generated 3D image;
    determining whether the received 2D image is a non-face close-up image, the determining comprises:
        detecting that the received 2D image is not a face portrait;
        dividing the received 2D image into a plurality of cells;
        segmenting foreground cells containing a foreground object from background cells in the plurality of cells, the segmenting comprises:
            choosing a first foreground cell based on sharpness values of pixels in the first foreground cell and sharpness values of pixels in the plurality of cells excluding the first foreground cell, and
            iteratively selecting a next foreground cell adjacent to selected foreground cells based on sharpness values of pixels in a candidate foreground region, sharpness values of pixels in a candidate background region, and sharpness values of pixels in the plurality of cells;
        extracting features from the segmented foreground and background cells; and
        classifying the received 2D image as a non-face close-up image based on the extracted features.

2. The method of claim 1, further comprising determining whether the received 2D image is a face portrait, the determining comprises:
    detecting whether the received 2D image includes a human face image;
    if the human face image is detected, determining whether a size of the human face image reaches a certain proportion of a size of the received 2D image; and
    classifying the received 2D image as a face portrait based on the determination that the size of the human face image reaches the certain proportion of the size of the received 2D image.

3. The method of claim 1, further comprising:
    creating the disparity between a left eye image and a right eye image for the face portrait, wherein the face portrait is detected to include a human face image, the creating comprises:
        creating the disparity by shifting edges of the detected human face image according to corresponding gradient strength and values in a face depth map, wherein non-edge regions of the detected human face image are not shifted, and the face depth map is acquired based on detecting the human face image.

4. The method of claim 3, further comprising:
interpolating image data to fill a gap in the 3D image due to shifting of the edges of the detected human face image.

5. The method of claim 3, wherein the face depth map comprises:
a size or a position of at least one of face parts including a left eye, a right eye, a nose, or a mouth; and
a global face depth.

6. The method of claim 3, further comprising:
if the detected human face image includes a face rotation:
adjusting the face depth map based on the face rotation; and
creating the disparity by shifting the edges of the detected human face image according to corresponding gradient strength and values in the adjusted face depth map.

7. The method of claim 1, further comprising interpolating image data at a gap due to shifting of the edges of the foreground object.

8. A computer-implemented method for converting a 2D image into a 3D image, the method comprising:
receiving the 2D image;
determining whether the received 2D image is a close-up image, wherein the close-up image is a face portrait or a non-face close-up image, wherein the close-up image includes a sharp foreground and a blurred background;
if the received 2D image is determined to be a close-up image, creating a disparity between a left eye image and a right eye image based on a local gradient and a spatial location;
generating the 3D image based on the created disparity;
outputting the generated 3D image;
detecting a frame violation based on a foreground object in the received 2D image, wherein the foreground object contacts an edge of a display screen;
creating the disparity between a left eye image and a right eye image based on a vertical location of the foreground object;
multiplying the disparity by a coefficient which increases with a distance to the edge of the display screen; and
decreasing the disparity when approaching the edge of the display screen.

9. An apparatus for converting a 2D image into a 3D image, the apparatus comprising:
a portrait detector to determine whether the 2D image is a close-up image, wherein the close-up image is a face portrait or a non-face close-up image, wherein the close-up image includes a sharp foreground and a blurred background;
a portrait 2D-to-3D converter to:
create a disparity between a left eye image and a right eye image based on a local gradient and a spatial location if the 2D image is determined to be a close-up image, and
generate the 3D image based on the created disparity; and
an image rendering engine to render the generated 3D image, wherein the portrait detector comprises a non-face close-up image detector to:
divide the received 2D image into a plurality of cells, wherein the portrait detector determines that the received 2D image is not a face close-up image;
segment foreground cells containing a foreground object from background cells in the plurality of cells, wherein the non-face close-up image detector:
chooses a first foreground cell based on sharpness values of pixels in the first foreground cell and sharpness values of pixels in the plurality of cells excluding the first foreground cell, and
iteratively selects a next foreground cell adjacent to selected foreground cells based on sharpness values of pixels in a candidate foreground region, sharpness values of pixels in a candidate background region, and sharpness values of pixels in the plurality of cells;
extract features from the segmented foreground and background cells; and
classify the received 2D image as a non-face close-up image based on the extracted features.

10. The apparatus of claim 9, wherein the portrait detector comprises a face portrait detector to:
detect whether the received 2D image includes a human face image;
if the human face image is detected, determine whether a size of the human face image reaches a certain proportion of a size of the received 2D image; and
classify the received 2D image as a face portrait based on the determination that the size of the human face image reaches the certain proportion of the size of the received 2D image.

11. The apparatus of claim 9, wherein the portrait 2D-to-3D converter comprises a face portrait 2D-to-3D converter to:
create the disparity by shifting edges of a human face image included in the received 2D image according to corresponding gradient strength and values in a face depth map, wherein:
non-edge regions of the detected human face image are not shifted, and
the face depth map is acquired based on detecting the human face image;
interpolate image data at a gap due to shifting of the edges of the human face image; and
generate the 3D image based on the created disparity and the interpolated image data.

* * * * *